July 3, 1962   C. A. CHRISTIAN   3,042,016
GAS VAPORIZER ATTACHMENT
Filed Feb. 9, 1961   2 Sheets-Sheet 1

Clarence A. Christian
INVENTOR.

BY *Clarence A. O'Brien*
*and Harvey B. Jacobson*
Attorneys

July 3, 1962

C. A. CHRISTIAN 3,042,016

GAS VAPORIZER ATTACHMENT

Filed Feb. 9, 1961

Clarence A. Christian
INVENTOR.

BY *Clarence A. O'Brien
and Harvey B. Jackson*
Attorneys

United States Patent Office 3,042,016
Patented July 3, 1962

3,042,016
GAS VAPORIZER ATTACHMENT
Clarence A. Christian, P.O. Box 2621,
San Antonio, Tex.
Filed Feb. 9, 1961, Ser. No. 88,083
7 Claims. (Cl. 123—122)

This invention comprises a novel and useful gas vaporizer attachment and more particularly relates to a device adapted to be placed between a carburetor and the intake manifolds of internal combustion engines to preheat and thus more completely vaporize the combustible mixture passing from the carburetor into the intake manifold.

In the fuel induction system of modern internal combustion engines there is wide variation in the suction or manifold pressure prevailing in the fuel induction system and in the temperature of the inducted combustible mixture occasioned by wide variations in the speeds of the engine to which the fuel induction system is connected. Inasmuch as such variations in temperature and pressure produce wide discrepancies in the efficiency and completeness of vaporization of the combustible mixture, frequent difficulties are encountered in the volumetric efficiency of engine operation throughout the various speed and load ranges of an engine. It is generally recognized by those qualified in the science of designing and operating internal combustion engines that if thorough and effective vaporization of the combustible mixture could be uniformly maintained during all these feed and load variations of the engine, a much greater volumetric efficiency and a much better performance of the engine throughout these various ranges could be attained.

It is therefore the primary purpose of this invention to provide a device which will effect a thorough and effective vaporization of the combustible mixture during its passage from the carburetor to the intake ports of an internal combustion engine.

A further object of the invention is to provide a device in accordance with the foregoing objects which shall be of simple and inexpensive construction, easily installed, will require substantially no attention and servicing during its operation and which shall be highly effective for the purposes intended.

A still further object of the invention is to provide a device in accordance with the foregoing objects which shall be capable of being readily interposed between a carburetor and the intake manifold without necessitating any change in the construction or arrangement of these parts of an engine.

Yet another object of the invention is to provide a device in accordance with the foregoing objects which shall be equally applicable to use with tool inductions systems employing either two barrel or four barrel carburetors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

It is a known characteristic of various types of four barrel carburetors that under conditions of normal engine operations, that is under less than full throttle conditions, the combustible mixture is supplied to the intake manifold through only two barrels of a carburetor, as for example through the two front barrels or the two rear barrels thereof. It is only during full load or full throttle conditions that fuel is supplied through all four barrels of the carburetor to the intake manifold. Under full load or full throttle conditions, there is sufficient suction present to insure substantially complete and satisfactory vaporization of fuel mixture. Consequently, the application of a supplemental vaporizer to the two barrels of the carburetor which are utilized only under full load conditions is not vital and from the practical standpoint can be readily dispensed with.

In the case of two barrel carburetors, the fuel from the carburetor to the engine is supplied at all times to the two barrels regardless of whether the engine is under normally running conditions or under full load or full throttle condition. Consequently, for a two barrel carburetor it is desirable to apply auxiliary vaporization means for the combustible mixture to both barrels thereof.

Figure 1:
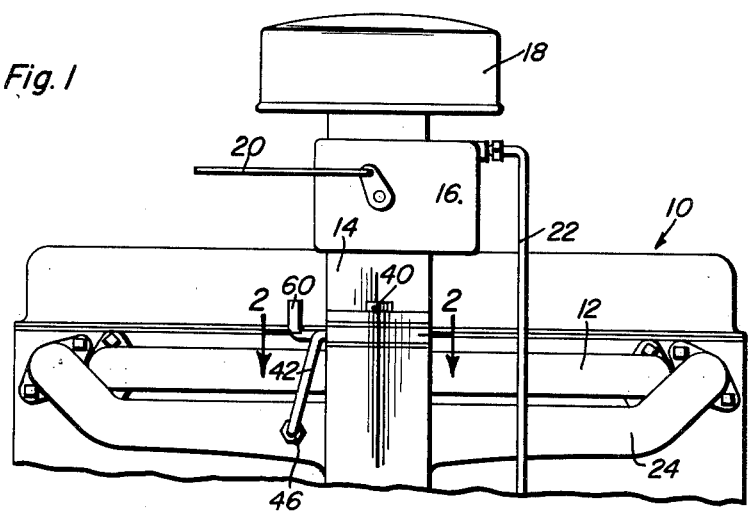
FIGURE 1 is a side elevational view of a portion of an internal combustion engine and the fuel induction system therefore and showing the manner in which the vaporizer of the present invention is applied thereto.
Figure 2:
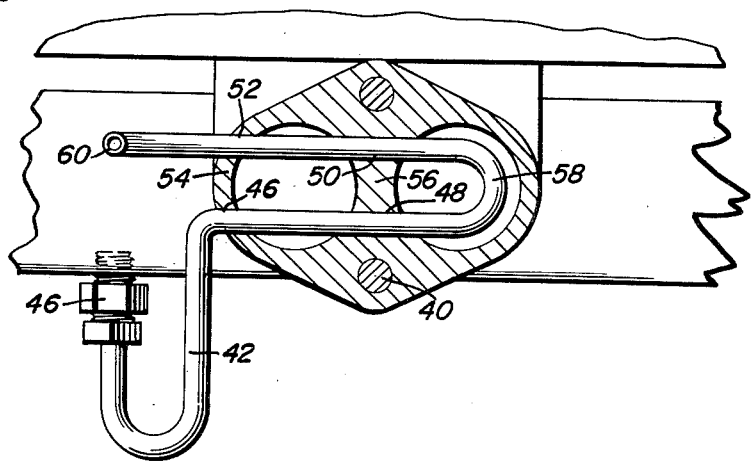
FIGURE 2 is a detailed view in horizontal section taken upon an enlarged scale substantially upon the plane indicated by section line 2—2 of FIGURE 1 and showing the manner in which the vaporizer is applied to a conventional two barrel type of carburetor.
Figure 3:
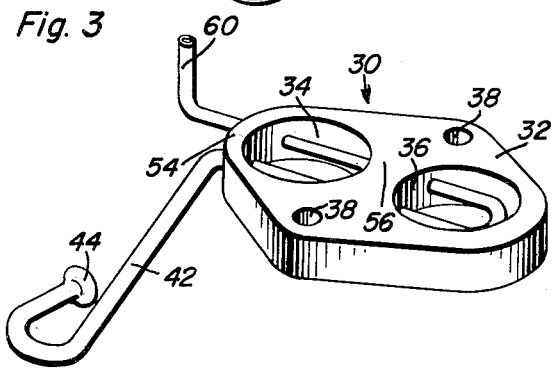
FIGURE 3 is a perspective view of the vaporizer attachment of FIGURES 1 and 2.
Figure 4:
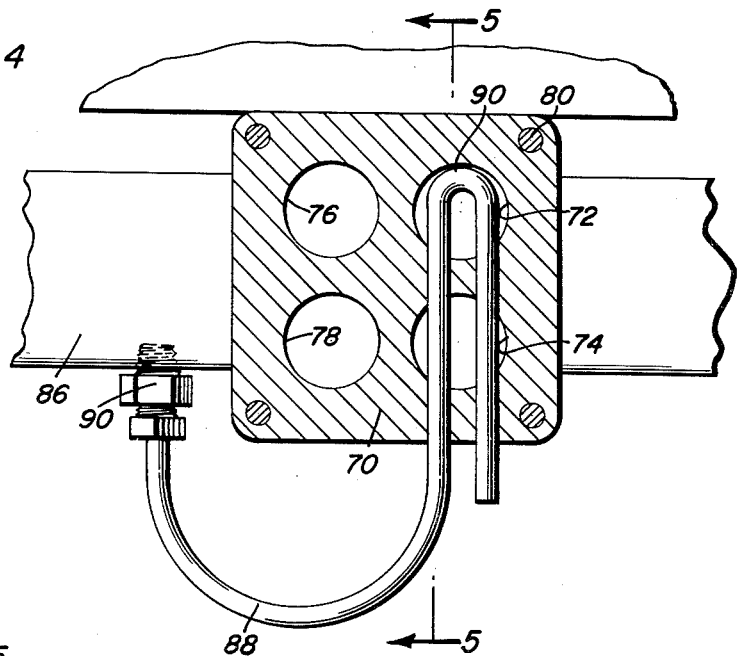
FIGURE 4 is a view similar to FIGURE 2 but showing the application of the vaporizer to a four barrel type of carburetor.
Figure 5:
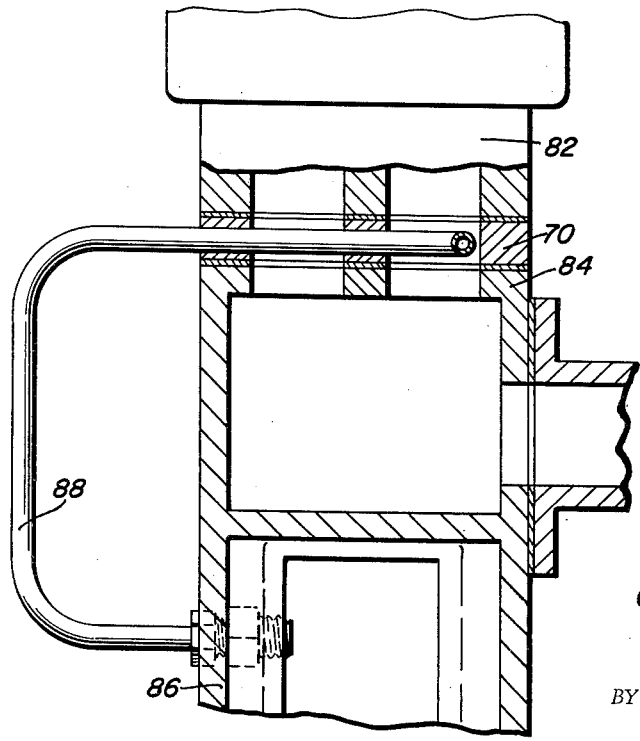
FIGURE 5 is a vertical transverse sectional view taken substantially upon the plane indicated by section line 5—5 of FIGURE 4.

In the embodiment of FIGURES 1–3 the invention has been shown as applied to a two barrel carburetor fuel induction system and as above indicated the vaporization system of this invention is thus supplied to both barrels thereof. In the arrangement of FIGURES 4 and 5, the invention is shown as applied to a four barrel carburetor system with the auxiliary vaporizer being associated with only the two barrels of the carburetor which are operable under normal running conditions.

Referring now particularly to FIGURES 1–3 it will be observed that number 10 indicates generally an internal combustion engine of any conventional type and which is provided with an induction system including an intake manifold 12 including an intake manifold riser 14 to which a two barrel carburetor 16 of any conventional type is normally connected, the carburetor in turn having an air filter or air cleaner 18 in accordance with conventional practice. Indicated at 20 is the conventional throttle valve control link, while the numeral 22 designates the fuel supply line by which fuel is delivered from the fuel tank, not shown, to the carburetor 16. Also indicated in FIGURE 1 by the numeral 24 is the conventional exhaust manifold of the engine.

It is in this environment that the attachment forming the subject matter of this invention and which is designated generally by the numeral 30, see FIGURE 3, is installed. The attachment consists of an auxiliary vaporizer device which is adapted to be readily inserted between the intake riser 14 and the intake manifold 12 in order to provide an auxiliary heater and vaporizer therebetween.

The attachment consists of a vaporizer body 32 in the form of a relatively thickened plate and which is provided with a pair of apertures as at 34 and 36 which are of the same size as and which are adapted to register with the fuel passages in the intake pipe vaporizer 14 and in the intake pipe 12 to which the riser is normally connected. The body 32 also includes a pair of bores 38 therethrough which are appropriately spaced so that when the vaporizer is disposed between the mounting flanges by which the riser 14 was originally connected to the intake manifold 12, the same fastening bolts 40 or slightly longer ones if necessary may be employed to assemble the two mounting flanges of the riser and the intake manifold and the attachment 30 therebetween.

In accordance with this invention the insert or adapter body 32 incorporates therein heat exchange means by which the combustible mixture passing through the bores 34 and 36 from the carburetor to the intake manifold may be subjected to sufficient heat to insure complete vaporization of the liquid fuel component of the combustible mixture. For this purpose there is provided a conduit 42 preferably copper or other suitable material having a relatively high rate of heat exchange and which is provided at one end constituting the adit thereof with a flange 44 adapted to be secured as by a coupling 46 to a bore threaded into the exhaust manifold 24 whereby products of combustion may be withdrawn from the exhaust manifold and none of the exhaust pressure may be passed through the heat exchange tube 42.

This heat exchange tube extends through suitable aligned bores 46, 48 and 50, 52 in the end 54 and in the divider wall 56 of the body 32. This divider wall constituting the separating means between the two bores 34 and 36 thereof. The heat exchange tube 42 extends through the two bores 46 and 48, and through both of the ports or passages 34 and 36, then has a U-bend 58 and emerges from the body of the vaporizer attachment through the bores 50 and 52, having an exhaust terminus at 60. The terminus 60 may discharge to the atmosphere if desired, or may deliver the exhaust gases to any other desired and suitable destination.

In accordance with this invention any desired means may be provided to insure the proper rate of flow of the exhaust gases through the vaporizer tube 42 to effect the desired input into the combustible mixture passing from the carburetor to the bores of passages 34 and 36 to the intake manifold. As will be appreciated in some instances it may be desired to vary the rate of flow therethrough and any suitable means such as thermostatic control valve means, adjustable chokes or manually adjustable means can be provided for this purpose. Preferably, however, the size of the tube 42 itself can be relied upon to produce the necessary resistance to flow to thereby regulate the rate of flow to a desired value. A convenient manner of achieving this result may be to flatten or partially close the terminal portion 60 of the heat exchange tube to a desired extent as found to be necessary for an individual installation of the vaporizer.

When so installed it is now apparent that there will be a constant flow of exhaust gases from the exhaust conduit through the vaporizer device thereby preheating and effecting a substantailly complete vaporization of the combustible mixture passing from the carburetor 16 to the intake manifold 12 of the engine thereby improving the volumetric efficiency and the operation of the engine.

The embodiment of FIGURES 4-5 operates upon the same principles as those of FIGURES 1-3 previously described. However, in order to apply the invention to this form of the invention the adapter plate 30 of FIGURES 1-3 having but two ports or passages therethrough corresponding to those of a double-barrel carburetor is replaced by an equivalent adapter body 70. The adapter body 70 being designed for a four barrel carburetor has four passages or ports therethrough as indicated by the numerals 72, 74 and 76, 78. Two of the bores as for example 72 and 74 may communicate with the two barrels of the four barrel carburetor which are used for normal running conditions while the bores 76 and 78 may be communicated with those barrels of the carburetor which are used only under full load or full throttle operation. Obviously, either the two front bores or the two rear bores may be used for normal operation depending upon the intended operation of the particular carburetor and induction system in question. The fasteners 80 serve to secure the corresponding flanges of the intake manifold riser 82 of the four barrel carburetor engine to the intake manifold 84 of this type of engine. As in the preceding embodiment, the exhaust manifold 86 of the engine has a vaporizer tube 88 connected thereto and communicating therewith through the coupling 90 whereby exhaust gases may be withdrawn through the exhaust manifold for the purpose of heat exchange with the combustible mixture during the passage of the latter from the carburetor to the intake manifold.

As in the preceding embodiment this vaporizing tube includes a U-portion 90 so that there are two parallel heat exchange tubes disposed in the two selected fuel ports or passages of the adapter body. As in the preceding embodiment, the exit end of the vaporizer may be discharged from the atmosphere or to any other suitable destination.

It will be appreciated that the operation of this form of the invention is exactly identical to that previously described. The only difference is the actual construction of the adapter insert body 70 as compared to that of the adapter insert body 32 of FIGURES 1-3. If desired, all four barrels of the adapter body may be provided with the vaporizer tubes therein by merely duplicating the vaporizer tube construction 88 and its connection to the manifold over that shown in FIGURES 4 and 5. Alternatively, when the other two barrels of the carburetor are being employed as the normal fuel supplying means for the engine, the entire assembly may be reversed so as to position the vaporizer heating tube and their corresponding passages 72 and 74 in communication with the desired passages of the intake manifold riser and the intake manifold.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an internal combustion engine of the type having an exhaust manifold, an intake manifold with an intake riser and a multiple barrel carburetor communicating with said intake riser, said carburetor having a plurality of combustible mixture passages therein each registering with a corresponding passage in said riser, a fuel vaporizer attachment comprising an adapter plate disposed and secured between said carburetor and riser, said adapter plate having a plurality of passages therethrough each registering with corresponding passages in said riser and intake manifold, a vaporizer having a heat exchange portion extending across those passages in said body through which combustible mixture flows from the carburetor to the intake manifold during normal, less than full throttle engine operation, means communicating one end of said vaporizer with said exhaust manifold for placing exhaust gases in heat exchange relation with said combustible mixture.

2. The combination of claim 1 wherein said riser and the axes of said passages in said riser, intake manifold and adapter plate are substantially vertical, said heat exchange portion of said vaporizer extending horizontally.

3. The combination of claim 1 wherein said heat exchange portion is U-shaped having an inlet and a discharge section disposed in parallel relation and each extending through one side of said adapter body.

4. The combination of claim 3 wherein said heat exchange portion is disposed to supply heat to said combustible gases uniformly over substantially the entire area of each passage with which the vaporizer is associated.

5. The combination of claim 4 wherein said vaporizer has its inlet section downturned for attachment to said exhaust manifold and has its discharge section upturned.

6. The combination of claim 1 wherein said carburetor has four barrels and said riser, intake manifold and adapter body have each four passages, each communicating with a separate carburetor barrel.

7. The combination of claim 6 wherein said vaporizer is in heat exchange relation with only the two adapter body passages which receive combustible mixture from the carburetor under all load and throttle conditions of the engine.

References Cited in the file of this patent
UNITED STATES PATENTS

| | | |
|---|---|---|
| 1,300,630 | Mathis | Apr. 15, 1919 |
| 1,706,242 | Markovetz | Mar. 19, 1929 |